United States Patent [19]

Cosner

[11] E Patent Number: Re. 32,141

[45] Reissued Date of Patent: May 13, 1986

[54] SINK SCRAPER AND GARBAGE TAMPER FOR ELECTRIC GARBAGE DISPOSAL

[76] Inventor: Alice V. Cosner, 859 E. Jeffery St., Apt. 411, Boca Raton, Fla. 33431

[21] Appl. No.: 574,494

[22] Filed: Jan. 27, 1984

Related U.S. Patent Documents

Reissue of:

[64] Patent No.: 4,395,792
Issued: Aug. 2, 1983
Appl. No.: 168,719
Filed: Aug. 13, 1980

[51] Int. Cl.[4] ..... A47L 17/02; A47L 25/00

[52] U.S. Cl. ..... 15/105; 15/236 R; 294/2; 294/1.1

[58] Field of Search ..... 134/6, 8; 15/105, 236 R, 15/245; 294/1 R, 2; D32/35, 42

[56] References Cited

U.S. PATENT DOCUMENTS

| | | | |
|---|---|---|---|
| 2,766,471 | 10/1956 | McKenzie | 15/105 |
| 3,427,636 | 2/1969 | Seifert | 15/105 |
| 3,765,275 | 10/1973 | Johnson | D32/42 X |
| 3,780,393 | 12/1973 | Gaetke | 15/105 |
| 4,137,578 | 2/1979 | Felici | 15/105 X |
| 4,268,080 | 5/1981 | Lindley | 15/105 X |

*Primary Examiner*—Marc L. Caroff

[57] ABSTRACT

A device constructed in one solid piece for scraping, directing and tamping garbage to and through flexible splash guards leading into an electric garbage disposal unit in a kitchen sink includes a cylindrically shaped main tamper body, a continuous ridge extending from the external surfaces of the main tamper body and bisecting these surfaces to form three distinct ridge sections, and a cylindrically shaped handle attached to the main tamper body and of a smaller diameter. A portion of the main tamper body and the ridge taper toward the handle.

1 Claim, 2 Drawing Figures

SINK SCRAPER AND GARBAGE TAMPER FOR ELECTRIC GARBAGE DISPOSAL

Matter enclosed in heavy brackets [ ] appears in the original patent but forms no part of this reissue specification; matter printed in italics indicates the additions made by reissue.

The material used for this sink scraper and garbage tamper for electric garbage disposalls can be rubber, wood, metal or a synthetic man made material. Molded rubber or synthetic material is preferred as it will make this kitchen aid safe; easily cleaned; and hence sanitary.

The design is a solid cylinder $\frac{7}{8}''$ in diameter with a rounded or wedge shaped ridge $\frac{1}{8}''$ to $\frac{1}{4}''$ in height, which bisects the flat base of the cylinder and continues up the sides to 4" from the base of cylinder. At this point the top of the cylinder may remain flat or preferably taper for 1" to a point from which a rod like handle $\frac{1}{2}''$ in diameter will extend.

The purpose is threefold:

1. To scrape garbage in the sink to the center of electric garbage disposall with the rounded or wedge shaped ridge which extends from the base.

2. The cylinder will facilitate in tamping large pieces of garbage down into the disposall.

3. The placement of a ridge, on either side of cylinder, above area where garbage is lodged between rubber disposall guards will free the garbage that water cannot readily flush down the drain, when slight tamping action is employed.

DETAILED DESCRIPTION OF DRAWING

Figure 1A:
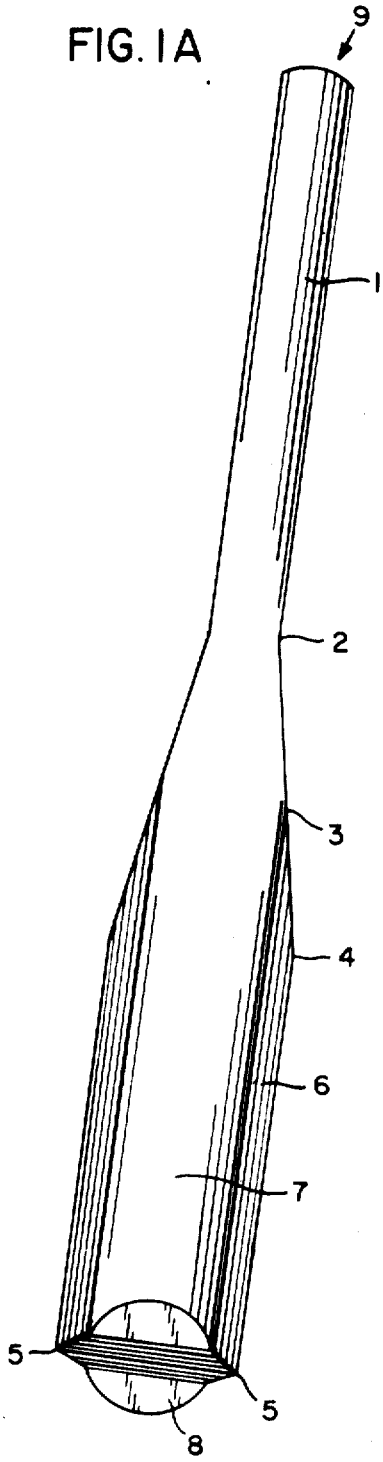
FIG. 1A is a front elevation view of device with a small wedge shaped ridge.
Figure 1:
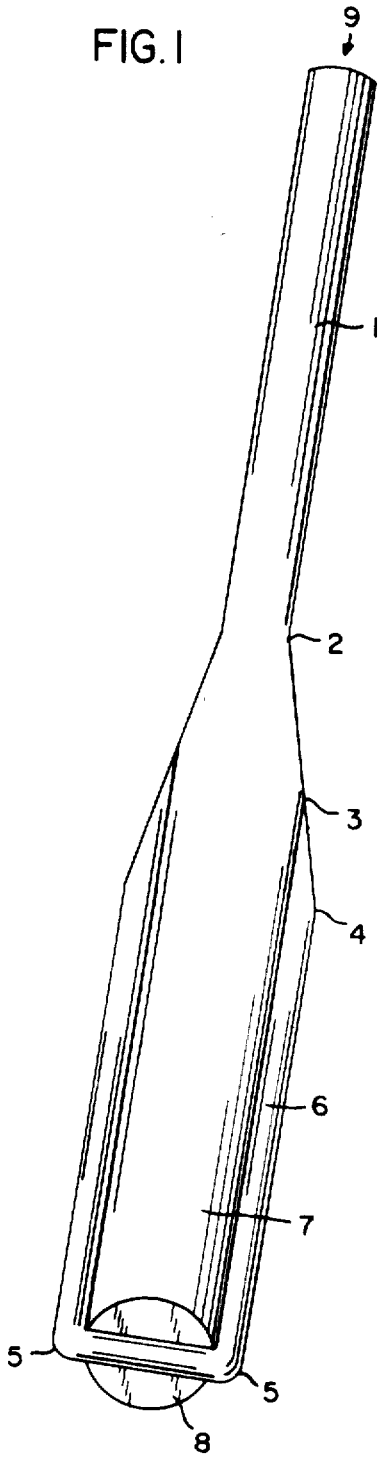
FIG. 1 is a front elevation view of device with a small rounded shaped ridge.

Illustrated in FIG. 1 and in FIG. 1A is the solid one piece device indicated in its entirety by the reference number 9 and whose round base 8 gives maximum area for tamping and ease in entering the flexible splash guards without undo force and rendering them useless.

The two opposite sides of the larger cylinder body 7 are bisected by a continuous ridge 6 of FIG. 1 or FIG. 1A. This ridge 6 is integral to the larger cylinder body 7 and forms a long ridge on two of the cylinder 7 sides and a shorter ridge on base 8.

The rounded corners 5 are formed by 90° angles as the ridges on either side and the ridge on the base 8 meet and form a continuous U-shaped ridge.

Points 5 aid in freeing garbage trapped between the two flexible splash guards of disposall.

At point 4 the ridges of wider cylinder 7, terminates in an obtuse angle which aligns at point 3 where the top of wider cylinder 7, slopes upward from point 3 to point 2, forming a base for handle 1, as well as enabling device to enter below or withdraw from flexible splash guards with ease.

At point 2, the rod-like handle 1, extends to desired length. This gives unhindered flexibility to its use as a scraper or in a mass of deep garbage, as a pusher-scraper.

DIMENSIONS

The dimensions of device 9, are as follows:

Ref. No. 1—handle $\frac{1}{2}''$ in diameter and at least 4" long
Ref. No. 2 to Ref. No. 3—1" in length—base or handle
Ref. No. 6—Ridge diameter—$\frac{1}{4}''$ (FIG. 1 or FIG. 1A)
Ref. No. 7—Wider cylinder—4" high and $\frac{7}{8}''$ in diameter
Ref. Nos. 5—Widest part—$1\frac{3}{8}''$

I claim:

1. A device for scraping, directing, and tamping garbage to and through flexible splash guards that rim a drain opening leading directly into an electric garbage disposal unit positioned below a kitchen sink; said device being constructed in one solid piece and comprising: a cylindrically shaped main tamper body including a flat base surface for tamping and an axially extending side surface substantially perpendicular to said base surface; an integrally formed continuous ridge extending from the base surface and side surface of the main tamper body which bisects said surfaces to form three distinct ridge sections, one of said sections bisecting the base surface and the other two sections being diametrically opposed to one another and extending axially along the side surface *of the device* with a terminal portion of each of said two diametrically opposed ridge sections sloping toward the side surface *of the device*; and a cylindrically shaped handle integrally connected to the main tamper body and having a diameter [equal to about half] *less than* the diameter of the main tamper body[, a terminal portion of the side surface tapering to a diameter equal to that of the handle and with a slope equal to that of the terminal portion of each of said two diametrically opposed ridge sections].

* * * * *